United States Patent
Ramos et al.

(10) Patent No.: US 12,518,764 B2
(45) Date of Patent: Jan. 6, 2026

(54) METHOD AND APPARATUS FOR REAL-TIME SOUND ENHANCEMENT

(71) Applicant: SAMSUNG ELECTRONICS CO., LTD., Suwon-si (KR)

(72) Inventors: Alberto Gil Ramos, Middlesex (GB); Carlos Purves, Middlesex (GB); Abhinav Mehrotra, Middlesex (GB); Sourav Bhattacharya, Middlesex (GB); Ravichander Vipperla, Middlesex (GB); Syed Samin Ishtiaq, Middlesex (GB); Nicholas Donald Atkins Lane, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 18/322,228

(22) Filed: May 23, 2023

(65) Prior Publication Data

US 2023/0298593 A1 Sep. 21, 2023

Related U.S. Application Data

(63) Continuation of application No. PCT/KR2022/004204, filed on Mar. 25, 2022.

(30) Foreign Application Priority Data

Mar. 26, 2021 (GB) ........................ 2104280
Oct. 7, 2021 (GB) ........................ 2114393

(51) Int. Cl.
*G10L 17/20* (2013.01)
*G10L 17/02* (2013.01)
(Continued)

(52) U.S. Cl.
CPC .............. *G10L 17/20* (2013.01); *G10L 17/02* (2013.01); *G10L 17/04* (2013.01); *G10L 17/18* (2013.01); *G10L 21/0232* (2013.01)

(58) Field of Classification Search
CPC ......... G10L 17/20; G10L 17/02; G10L 17/04; G10L 17/18; G10L 21/0232
See application file for complete search history.

(56) References Cited

U.S. PATENT DOCUMENTS 10,373,612 B2  8/2019  Parthasarathi et al.
10,783,899 B2  9/2020  Graf et al.
(Continued)

FOREIGN PATENT DOCUMENTS

JP   2013-114151     6/2013
KR   10-2012-0066523 6/2012
(Continued)

OTHER PUBLICATIONS

Hannun et al., "Sequence-to-Sequence Speech Recognition with Time-Depth Separable Convolutions", Apr. 4, 2019, 5 pages.
(Continued)

*Primary Examiner* — Bhavesh M Mehta
*Assistant Examiner* — Eunice Lee
(74) *Attorney, Agent, or Firm* — Nixon & Vanderhye P.C.

(57) ABSTRACT

Broadly speaking, the present techniques generally relate to a system, computer-implemented method and apparatus for training a machine learning, ML, model to perform sound enhancement for a target user in real-time, and to a method and apparatus for using the trained ML model to perform sound enhancement of audio signals in real-time. Advantageously, the present techniques are suitable for implementation on resource-constrained devices that capture audio signals, such as smartphones and Internet of Things devices.

18 Claims, 15 Drawing Sheets

(51) Int. Cl.
*G10L 17/04* (2013.01)
*G10L 17/18* (2013.01)
*G10L 21/0232* (2013.01)

(56) References Cited

U.S. PATENT DOCUMENTS

| | | | |
|---|---|---|---|
| 10,902,843 | B2 | 1/2021 | Dimitriadis et al. |
| 11,456,005 | B2 | 9/2022 | Mosseri et al. |
| 11,854,564 | B1 * | 12/2023 | Chatlani .................. G10L 15/16 |
| 2012/0004909 | A1 | 1/2012 | Beltman et al. |
| 2017/0110142 | A1 | 4/2017 | Fan et al. |
| 2019/0156837 | A1 | 5/2019 | Park et al. |
| 2019/0392852 | A1 | 12/2019 | Hijazi et al. |
| 2020/0312336 | A1 * | 10/2020 | Kang ...................... G10L 15/07 |
| 2020/0349965 | A1 * | 11/2020 | Nesta ........................ G06N 3/08 |
| 2021/0280171 | A1 * | 9/2021 | Phatak .................... G06N 3/045 |
| 2021/0312907 | A1 * | 10/2021 | Moreno .................. G10L 25/78 |
| 2022/0068256 | A1 * | 3/2022 | Jia .......................... G10L 13/033 |
| 2022/0270625 | A1 * | 8/2022 | Dai .......................... G10L 21/02 |
| 2022/0335953 | A1 * | 10/2022 | Rikhye ................... G10L 17/06 |
| 2023/0186937 | A1 * | 6/2023 | Uhlich .................... G10L 15/22 704/251 |

FOREIGN PATENT DOCUMENTS

| | | |
|---|---|---|
| KR | 10-1843079 | 5/2018 |
| WO | 2020/256257 | 12/2020 |
| WO | 2022056226 | 3/2022 |

OTHER PUBLICATIONS

Wang et al., "TSTNN: Two-stage Transformer based Neural Network for Speech Enhancement in the Time Domain", Mar. 2021, 5 pages.
Lam et al., "Effective Low-Cost Time-Domain Audio Separation Using Globally Attentive Locally Recurrent Networks", Jan. 13, 2021, 8 pages.
Pandey et al., "Dual Application of Speech Enhancement for Automatic Speech Recognition", Nov. 7, 2020, 6 pages.
Pandey et al.,"Dual-path Self-Attention RNN for Real-Time Speech Enhancement", Apr. 29, 2021, 5 pages.
Luo et al., "Conv-TasNet: Surpassing Ideal Time-Frequency Magnitude Masking for Speech Separation", Aug. 2019, 11 pages.
Luo et al., Ultra-Lightweight Speech Separation via Group Communication, Nov. 20, 2020, 5 pages.
Choi et al., "Real-time Denoising and Dereverberation with Tiny Recurrent U-Net", Feb. 5, 2021, 5 pages.
"Silero Models: pre-trained speech-to-text, text-to-speech and text-enhancement models made embarrassingly simple", Dec. 26, 2022.
Panayotov et al., "Librispeech an ASR corpus based on public domain audio books", 2015, 5 pages.
"VoxForge Corpus", 2006, 2 pages.
Wang et al., "VoiceFilter Targeted Voice Separation by Speaker-Conditioned Spectrogram Masking", Sep. 15-19, 2019, 5 pages.
Wang et al., "VoiceFilter—Lite Streaming Targeted Voice Separation for On-Device Speech Recognition", Oct. 25-29, 2020, 5 pages.
International Search Report dated Jul. 4, 2023 issued in International Patent Application No. PCT/KR2022/004204, 4 pages.
Written Opinion of the ISA dated Jul. 4, 2023 issued in International Patent Application No. PCT/KR2022/004204, 5 pages.
Combined Search and Examination Report for GB2114393.8 dated Jun. 7, 2022, 12 pages.
Extended European Search Report dated Feb. 5, 2024 issued in European Patent Application No. 22776141.8.
Communication under Rule 71(3) EPC issued Feb. 20, 2025 in corresponding European Patent Application No. 22776141.8.
Shi et al., "Speaker Re-identification with Speaker Dependent Speech Enhancement", Aug. 27, 2020, 5 pages.
Giri et al., "Personalized PercepNet: Real-time, Low-complexity Target Voice Separation and Enhancement", Interspeech 2021, Aug. 30-Sep. 3, 2021, Brno, Czechia, pp. 1124-1128.

* cited by examiner

FIG. 9

| Model | Configuration | English | | Spanish | | German | |
|---|---|---|---|---|---|---|---|
| | | Babble | Ambient | Babble | Ambient | Babble | Ambient |
| PSE-NET | RNN[600], FB=1, FL=2 | 9.067 | 12.397 | 5.782 | 8.702 | 4.045 | 9.686 |
| PSE-NET | RNN[600], FB=1, FL=3 | 9.306 | 12.456 | 6.068 | 8.292 | 4.504 | 9.450 |
| PSE-NET | RNN[600], FB=2, FL=2 | 9.355 | 12.604 | 5.930 | 8.645 | 4.112 | 9.872 |
| VFLite | L=RNN[1024], N=5 | 6.543 | 12.132 | −0.084 | 8.634 | 0.007 | 9.007 |
| VF | Non-causal | 10.164 | 13.275 | 6.760 | 10.329 | 5.638 | 11.022 |

FIG. 10

| Model | Configuration | English | | | Spanish | | | German | | |
|---|---|---|---|---|---|---|---|---|---|---|
| | | Clean | Babble | Ambient | Clean | Babble | Ambient | Clean | Babble | Ambient |
| Identity | - | 0.082 | 0.894 | 0.173 | 0.012 | 0.891 | 0.092 | 0.153 | 1.244 | 0.274 |
| PSE-NET | RNN[600], FB=1, FL=2 | 0.086 | 0.206 | 0.145 | 0.031 | 0.285 | 0.091 | 0.200 | 0.724 | 0.296 |
| PSE-NET | RNN[600], FB=1, FL=3 | 0.101 | 0.194 | 0.144 | 0.074 | 0.263 | 0.102 | 0.231 | 0.660 | 0.304 |
| PSE-NET | RNN[600], FB=2, FL=2 | 0.089 | 0.194 | 0.142 | 0.031 | 0.297 | 0.090 | 0.187 | 0.744 | 0.288 |
| VFLite | L=RNN[1024], N=5 | 0.082 | 0.373 | 0.152 | 0.068 | 0.600 | 0.105 | 0.199 | 1.043 | 0.298 |
| VF | Non-causal | 0.081 | 0.153 | 0.128 | 0.017 | 0.270 | 0.062 | 0.160 | 0.634 | 0.246 |

FIG. 14

| Model | Embedding | WER | | | SDR | | |
|---|---|---|---|---|---|---|---|
| | | Clean | Babble | Ambient | Clean | Babble | Ambient |
| Identity | – | 8.2 | 89.4 | 17.3 | – | – | – |
| PSE-NET | xvec (baseline) | 8.9 | 19.4 | 14.2 | 47.267 | 11.642 | 16.537 |
| PSE-NET | Unit | 13.0 | 39.9 | 15.3 | 36.589 | 6.525 | 15.458 |
| PSE-NET | Zeros | 17.8 | 31.2 | 15.8 | 32.009 | 8.921 | 15.539 |
| PSE-NET | Random | 42.3 | 64.0 | 24.4 | 5.287 | 0.74 | 10.11 |

FIG. 15

| Model | Embedding Duration | WER | | | SDR | | |
|---|---|---|---|---|---|---|---|
| | | Clean | Babble | Ambient | Clean | Babble | Ambient |
| Identity | – | 8.2 | 89.4 | 17.3 | – | – | – |
| PSE-NET | 1s | 9.1 | 20.9 | 14.2 | 46.105 | 11.276 | 16.453 |
| PSE-NET | 2s | 8.9 | 19.8 | 14.2 | 47.145 | 11.592 | 16.533 |
| PSE-NET | 3s | 8.9 | 19.4 | 14.2 | 47.267 | 11.642 | 16.537 |

METHOD AND APPARATUS FOR REAL-TIME SOUND ENHANCEMENT

CROSS-REFERENCE TO RELATED APPLICATION(S)

This application is a continuation application, claiming priority under § 365(c), of an International application No. PCT/KR2022/004204, filed on Mar. 25, 2022 which is based on and claims the benefit of a United Kingdom application number 2104280.9, filed on Mar. 26, 2021 in the United Kingdom Intellectual Property Office and a United Kingdom application number 2114393.8, filed on Oct. 7, 2021 in the United Kingdom Intellectual Property Office, the disclosure of which is incorporated by reference herein in its entirety.

BACKGROUND

1. Field

The present application generally relates to a method for real-time sound enhancement, and in particular to a computer-implemented method and apparatus for training a machine learning, ML, model to perform sound enhancement for a target user in real-time.

2. Description of Related Art

Real-world speech signal recordings are often corrupted with environmental noises and interfering speakers. Audio source separation or speech enhancement techniques, can potentially be used as an audio pre-processing step to suppress such noises for improved user-experience in a number of applications, including mobile voice communications, conference calls, hearing aids, and other down-stream audio recognition tasks, such as robust automatic speech recognition (ASR). The current wide-spread trend in using speech-aware applications on mobile and IoT devices has also been driving research interests in development of real-time speech enhancement solutions that can run efficiently on-device.

SUMMARY

Recent advancements in speech enhancement have improved the quality of existing speech enhancement solutions which do not operate in real-time. Typically, these solutions are used to clean collected data for training of other audio tasks. For example, speech enhancement techniques are focused on enhancing perceptual quality of telephony or the performance of audio related down-stream tasks such as lower word error rate, WER, for automatic speech recognition, ASR.

There is a significant body of work aimed at offline (i.e. non real-time) speech enhancement. Currently, however, on-device deployment of real-time speech enhancement solutions have not been achieved for a variety of resource-constrained devices (such as smartphones and Internet of Things, IoT, devices).

Most work on decreasing model size and/or latency for effective deployment is based on bidirectional architectures (i.e., non-causal), or on couples of inter- and intra-unidirectional architecture components applied in a dual path manner which effectively require access to the entire past, present and future to enhance the present frame (e.g., group communication line of work), and are therefore unsuitable for real-time deployment.

The present applicant has recognised the need for an improved sound enhancement mechanism that overcomes these problems.

In a first approach of the present techniques, there is provided a computer-implemented method for using a trained machine learning, ML, model to perform real-time sound enhancement for a target user, the method comprising: obtaining a noisy audio signal comprising speech of a target user and noise; determining whether a speaker embedding vector for the target user exists; and using neural networks of the trained ML model, to remove the noise from the noisy audio signal while maintaining the speech of the target user by switching the trained ML model to perform personalised or non-personalised noise removal depending on whether the speaker embedding vector exists.

Generally speaking, there are two broad types of interfering noise that may appear in an audio signal that contains speech of a target user (i.e. a specific individual human), and each type of interfering noise may make it difficult to discern or hear the speech of the target user. The interfering noise can make it difficult for participants in an audio or video call with the target user to understand what the target user is saying. Similarly, applications such as automatic speech recognition which act on audio signals containing speech may not perform well when the audio signal contains interfering noise. The two broad types of interfering noise are environmental or ambient noise, and babble noise. Environmental noise is the background noise in an environment, and this type of noise may vary across different environments, For example, the background noise in a train or train station may include train and safety announcements, while the background noise in a cafe may contain the sounds of coffee machines or cups clattering, and the background noise in an office may contain the sounds of printers and telephones ringing. Babble noise is the sound of other people talking in the vicinity of the target user, or when someone speaks at the same time as the target user during a multi-person video or conference call.

Advantageously, the present techniques provide a single trained machine learning, ML, model, which is able to perform sound enhancement on audio signals that contain speech in real-time. The same model is able to perform two types of sound enhancement: personalised noise removal and non-personalised noise removal. The non-personalised noise removal is able to remove only the environmental noise from an audio signal. In this case, the model does not know what the target user sounds like and is unable to distinguish between the target user and any other person or people talking, which means the model cannot remove babble noise from the audio signal. The personalised noise removal is able to remove both babble noise and environmental noise from an audio signal. This is because the model does know what the target user sounds like, and so can remove babble noise from the audio signal. Thus, the present techniques are beneficial because they are able to perform sound enhancement on any audio signal containing speech, even when the model does not know anything about the main/target speaker. This may also enable audio signals to be enhanced before they are, for example, transmitted to a participant in an audio call, and when they are received from a participant in an audio call.

As mentioned above, the ML model performs personalised or non-personalised speech enhancement depending on whether a speaker embedding vector of the target user exists. However, in both cases, the inputs to the ML model include the noisy audio signal and a vector that represents the speech profile of the target user. In the case where the speaker embedding vector for the target user is known, this is the vector that is input to the ML model and the vector actually represents the speech profile of the target user. In the case where the target user is not known, and the speaker embedding vector of the target user is not known, the vector that is input to the ML model is a zero vector which represents the fact that the speech profile of the target user is unknown.

In many existing speech enhancement techniques, the vector is concatenated with each frame of the noisy audio signal (also known as a spectrogram), and this is input into the ML model for processing. However, this increases the size of the information to be processed by the ML model, which may require more computing resources (processing power and/or memory) and may increase latency. In contrast, in the present techniques, the vector is only concatenated with the noisy audio signal after the noisy audio signal has been processed by encoder and decoder modules of the ML model. Thus, the present techniques do not suffer from the same problems as existing techniques, and the present techniques may therefore advantageously be used on resource-constrained devices such as mid-tier and high-end smartphones and mobile devices.

Thus, in the present techniques, using neural networks of the trained ML model to remove the noise may comprise: inputting the corrupted audio signal into an encoder module of the trained ML model; concatenating a vector with each frame of the noisy audio signal after processing by the encoder module, to generate a modified noisy audio signal; inputting the modified noisy audio signal into a decoder module of the trained ML model; and concatenating the vector with each frame of the modified noisy audio signal after processing by the decoder module, to output an enhanced audio signal.

Preferably, when the speaker embedding vector exists, the vector that is concatenated with the outputs of the encoder and decoder modules is the speaker embedding vector, and the trained ML model is switched to perform personalised noise removal. In this case, ambient (environmental) noise and/or babble noise is removed from the output enhanced audio signal, while maintaining the speech of the target user.

Alternatively, when no speaker embedding vector exists, the vector that is concatenated with the outputs of the encoder and decoder modules is a zero vector, and the trained ML model is switched to perform non-personalised noise removal. In this case, only ambient noise is removed from the output enhanced audio signal, while maintaining the speech of the target user.

To state the above more explicitly, when the speaker embedding vector exists, the trained ML model is switched to perform personalised noise removal and, in this case, using neural networks of the trained ML model to remove the noise comprises: inputting the noisy audio signal into an encoder module of the trained ML model; concatenating the speaker embedding vector with each frame of the noisy audio signal after processing by the encoder module, to generate a modified noisy audio signal; inputting the modified noisy audio signal into a decoder module of the trained ML model; and concatenating the speaker embedding vector with each frame of the modified noisy audio signal after processing by the decoder module, to output an enhanced audio signal. Similarly, when no speaker embedding vector exists, the trained ML model is switched to perform non-personalised noise removal and, in this case, using neural networks of the trained ML model to remove the noise comprises: inputting the noisy audio signal into an encoder module of the trained ML model; concatenating a zero vector with each frame of the noisy audio signal after processing by the encoder module, to generate a modified corrupted audio signal; inputting the modified noisy audio signal into a decoder module of the trained ML model; and concatenating the zero vector with each frame of the modified noisy audio signal after processing by the decoder module, to output an enhanced audio signal.

When the speaker embedding vector does not exist, the method may further comprise generating a speaker embedding vector for the target user by: obtaining at least one clean audio signal of the target user; and applying a speaker recognition model to the at least one clean audio signal of the target user to generate a speaker embedding vector representing a speech profile of the target user. This may be performed at any time. That is, a user may be able to use the trained ML model without undergoing any enrolment process to provide a sample of their voice (i.e. the clean audio signal), because the trained ML model can simply perform non-personalised sound enhancement instead. Similarly, the trained ML model can clean incoming noisy audio signals generated by another person, such as a person the user is speaking to in an audio call, because the trained ML model does not need to know anything about that person in order to remove ambient noise from the audio signal before it is heard by the user. Any suitable speaker recognition model may be used to generate a speaker embedding vector of a target user.

The noisy audio signal may be obtained during an audio call. The method may further comprise transmitting the audio signal after processing by the trained ML model to another participant in the audio call. Thus, the 'cleaned-up' audio signal is transmitted to the listener(s) in the audio call (instead of the original noisy signal), thereby improving the sound quality of the audio call for the listener(s). It will be understood that the noisy signal could equally be obtained during an audio call from another participant in the audio call, and in this case, the noisy signal may be cleaned/denoised before the user hears the audio signal. Thus, as noted above, in the context of an audio call, the noisy audio signal that is enhanced in real-time may be the audio signal of the user that is sent to another participant or is the audio signal of the other participant that is sent to the user.

Additionally or alternatively, the method may further comprise inputting the audio signal after processing by the trained ML model into an automatic speech recognition, ASR, system. Thus, the 'cleaned-up' audio signal may be easier to process by the ASR system and may result in a lower word error rate.

In a second approach of the present techniques, there is provided an apparatus for using a trained machine learning, ML, model to perform real-time sound enhancement for a target user, the apparatus comprising: an audio capture device; and at least one processor coupled to memory and arranged to: obtain, from the audio capture device, a noisy audio signal comprising speech of a target user and noise; determine whether a speaker embedding vector for the target user exists; and use neural networks of the trained ML model, to remove the noise from the noisy audio signal while maintaining the speech of the target user by switching the trained ML model to perform personalised or non-personalised noise removal depending on whether the speaker embedding vector exists.

The features described above with respect to the first approach apply equally to the second approach and therefore are not repeated.

The noisy audio signal may be obtained during an audio call made using the apparatus. The processor may be arranged to transmit the audio signal after processing by the trained ML model to another participant in the audio call. Advantageously, this means that the user's speech is cleaned or denoised during an audio call and before it is transmitted to another participant in the call, which improves the sound quality of the call.

The processor may be arranged to input the audio signal after processing by the trained ML model into an automatic speech recognition system.

The apparatus may be any one of: a smartphone, tablet, laptop, computer or computing device, virtual assistant device, a vehicle, an autonomous vehicle, a robot or robotic device, a robotic assistant, image capture system or device, an augmented reality system or device, a virtual reality system or device, a gaming system, an Internet of Things device, or a smart consumer device (such as a smart fridge). It will be understood that this is a non-exhaustive and non-limiting list of example apparatus.

In a third approach of the present techniques, there is provided a method for training a machine learning, ML, model to perform real-time sound enhancement for a target user, the method comprising: obtaining a training dataset comprising a plurality of audio noise samples, a plurality of clean audio samples that each contain speech of individual speakers, and a speaker embedding vector for each individual speaker; generating, using the clean audio samples, corrupted audio samples by adding at least one noise sample to each clean audio sample; and training neural networks of the ML model, using the training dataset and the corrupted audio samples, to remove the noise from the corrupted audio samples while maintaining the speech of the individual speakers, and to learn to switch between performing personalised and non-personalised noise removal depending on whether the speaker embedding vector for an individual speaker is available during a training round.

Advantageously, in the present techniques a single model may be centrally trained, using a remote or cloud server, and is trained to remove noise from audio signals that contain speech of individual speakers. That is the training performed by the remote server generates a model which is able to process an audio signal containing a person's speech and interfering noise such that the processing removes the interfering noise from the audio signal. In this way, the audio signal is cleaned to remove as much of the interfering noise as possible, and thereby the speech is enhanced as it can be more easily heard within the resulting audio signal. As explained in more detail below, the interfering noise may at least partially overlap a person's speech. Further advantageously, as the model is trained centrally and then provided for deployment on end user devices, no training is required on the end user devices, even when the model is being used to perform personalised speech enhancement. This makes the model of the present techniques more suitable for resource-constrained devices, such as mid-tier smartphones, as the computationally-heavy training process does not need to be performed on the end-user devices.

The model trained using the remote or cloud server may be deployed on end user devices to enhance the speech of the users of those devices. The model trained using the remote server is able to perform personalised and non-personalised sound enhancement model because, as explained in more detail below, the model is trained using audio samples that contain speech. This is advantageous over other techniques for audio enhancement which are not trained specifically using audio samples containing speech. Thus, the model trained using the remote server may be used to perform real-time sound enhancement for a user because the model, at inference time, is able to remove noise from audio samples containing the user's speech.

Further advantageously, the way the ML model is trained to perform personalised and non-personalised sound enhancement does not require specific users to provide their voice samples to the remote server. Advantageously, this improves user privacy as the steps to enable the personalised sound enhancement at inference time do not require transmitting any personal user data (such as audio samples containing the user's speech) to the remote server.

As mentioned above with respect to inference time, an input into the ML model includes a vector that represents what is known about the target user. Thus, to achieve this, training neural networks of the ML model may comprise: inputting the corrupted audio sample into an encoder module of the ML model; concatenating a vector with each frame of the corrupted audio sample after processing by the encoder module, to generate a modified corrupted audio sample; inputting the modified corrupted audio sample into a decoder module of the trained ML model; and concatenating the vector with each frame of the modified corrupted audio signal after processing by the decoder module, to output an enhanced audio sample.

When the speaker embedding vector exists during a training round, the vector is the speaker embedding vector and the ML model switches to perform personalised noise removal. In this case, the model learns to remove ambient noise and/or babble noise from the output enhanced audio sample, while maintaining the speech of the target user.

Alternatively, when no speaker embedding vector exists, the vector is a zero vector and the ML model switches to perform non-personalised noise removal. In this case, the model learns to remove only ambient noise from the output enhanced audio sample, while maintaining the speech of the target user.

Training neural networks of the ML model may comprise: comparing each outputted enhanced audio sample with the corresponding clean audio sample and determining how well the outputted enhanced audio sample matches the corresponding clean audio sample; determining, using a result of the comparing, a loss function for training the neural networks; and updating the neural networks to minimise the loss function.

Additionally or alternatively, training neural networks of the ML model may comprise: applying an automatic speech recognition model to each clean audio sample to obtain a transcript of the speech; applying the automatic speech recognition model to each outputted enhanced audio sample to obtain a transcript of the speech; comparing the transcript of the speech from the outputted enhanced audio sample with the transcript of the speech from the corresponding clean audio sample and determining how well the transcript from the outputted enhanced audio sample matches the transcript from the corresponding clean audio sample; determining, using a result of the comparing, a loss function for training the neural networks; and updating the neural networks to minimise the loss function.

Obtaining a training dataset comprising a plurality of audio noise samples may comprise obtaining a plurality of audio noise samples that each contain speech of a different speaker, environmental noise or ambient noise. It may be beneficial to train the ML model using these particular types of audio noise because these types of audio noise are typically present in audio signals containing speech. For example, if a target user is on a telephone or video call with at least one other person, the target user may be interrupted by the other person or the other person may accidentally speak while the target user is still talking. These sorts of interruptions or overlapping speech sounds can make it difficult to determine what the target user is saying. Similarly, if the target user is on a telephone or video call in a noisy environment, such as on a train, in a cafe, or in an open-plan office, the background ambient sounds in that environment may make it difficult to determine what the target user is saying. Thus, by using these types of audio noise samples to train the ML model, the speech of a target user may be enhanced in many of the typical settings in which noise may make it difficult to determine what the target user is saying.

Generating the corrupted audio samples may comprise entirely overlaying the speech in a clean audio sample with an audio noise sample from the training dataset. This is useful because in some cases, noise may be present in the speech of a target user. For example, background ambient sounds may be present for the entire duration of a target user's speech. In another example, another speaker may speak over the entire duration of the target user's speech, as can often occur during videoconference calls, such as Zoom and Microsoft Teams meetings, when it is unclear whose turn it is to speak.

Generating the corrupted audio samples may comprise partially overlaying the speech in a clean audio sample with an audio noise sample from the training dataset. This is useful because in some cases, noise may be present only during a portion of the speech of a target user. For example, another speaker may still be speaking when the target user starts speaking (i.e. the target user interrupts the other speaker). In another example, another speaker may start speaking while the target user is still speaking (i.e. the other speaker interrupts the target user). In another example, a background sound may overlap the beginning or end of the speech of the target user.

Thus, the generated corrupted audio sample may comprise speech of an individual speaker and interfering utterance of another speaker that is overlaid over all of the speech of the individual speaker. In this case, training neural networks of the ML model to remove noise from the corrupted audio sample may comprise training the neural networks to remove the interfering utterance. This requires the speaker embedding vector of the individual speaker to be used during the training process, as the ML model needs to know which speaker's speech is to be retained and which speaker's speech is to be removed.

The generated corrupted audio sample may comprise speech of an individual speaker and interfering utterance of another speaker that is overlaid over a part of the speech of the individual speaker. In this case, training neural networks of the ML model to remove noise from the corrupted audio sample may comprise training the neural networks to remove the partially interfering utterance. This requires the speaker embedding vector of the individual speaker to be used during the training process, as the ML model needs to know which speaker's speech is to be retained and which speaker's speech is to be removed.

The generated corrupted audio sample may comprise speech of an individual speaker and ambient noise that is overlaid over all of the speech of the individual speaker. In this case, training neural networks of the ML model to remove noise from the corrupted audio sample may comprise training the neural networks to remove the ambient noise. This does not require a speaker embedding vector of the individual speaker to be used.

The generated corrupted audio sample may comprise speech of an individual speaker and ambient noise that is overlaid over a part of the speech of the target user. Training neural networks of the ML model to remove noise from the corrupted audio sample may comprise training the neural networks to remove the ambient noise that partially overlaps the speech. This does not require a speaker embedding vector of the individual speaker to be used.

Training neural networks of the ML model may comprise training the ML model to remove the audio noise sample from the corrupted audio samples and retain the speech of the individual speaker.

The method may further comprise generating the speaker embedding vectors in the training dataset by applying a speaker recognition model to each clean audio sample in the training dataset. Any suitable speaker recognition model may be used to determine the speech profile of each speaker represented by the clean audio samples.

Training neural networks of the ML model to remove noise may comprise training the neural networks to identify a noise type present in the corrupted audio signal and apply a noise removal process based on the identified noise type.

In a fourth approach of the present techniques, there is provided a server for training a machine learning, ML, model to perform real-time sound enhancement for a target user, the server comprising: at least one processor coupled to memory and arranged to: obtain a training dataset comprising a plurality of audio noise samples, a plurality of clean audio samples that each contain speech of individual speakers, and a speaker embedding vector for each individual speaker; generate, using the clean audio samples, corrupted audio samples by adding at least one noise sample to each clean audio sample; and train neural networks of the ML model, using the training dataset and the corrupted audio samples, to remove the noise from the corrupted audio samples while maintaining the speech of the individual speakers, and to learn to switch between performing personalised and non-personalised noise removal depending on whether the speaker embedding vector for an individual speaker is available during a training round.

The features described above with respect to the third approach apply equally to the fourth approach and therefore are not repeated.

In a related approach of the present techniques, there is provided a non-transitory data carrier carrying processor control code to implement the methods described herein. That is, there is provided a computer-readable storage medium comprising instructions which, when executed by a computer, cause the computer to carry out the steps of the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog (RTM) or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The methods described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

BRIEF DESCRIPTION OF THE DRAWINGS

Implementations of the present techniques will now be described, by way of example only, with reference to the accompanying drawings, in which:

FIG. 9 is a table showing SDRi results for the trained ML model and baseline models assessed across different languages, under ambient noise and babble;

FIG. 10 is a table showing the impact of the models of FIG. 9 on word error rate in automatic speech recognition tasks;

FIG. 14 is a table showing the contribution of a not having a speaker embedding vector for a target user on the performance of the ML model at removing ambient noise from an audio signal; and FIG. 15 is a table showing the impact of different lengths of enrolment data on the performance of the ML model at removing different types of noise from an audio signal.

DETAILED DESCRIPTION

Broadly speaking, the present techniques generally relate to a system, computer-implemented method and apparatus for training a machine learning, ML, model to perform sound enhancement for a target user in real-time, and to a method and apparatus for using the trained ML model to perform sound enhancement of audio signals in real-time. Advantageously, the present techniques are suitable for implementation on resource-constrained devices that capture audio signals, such as smartphones and Internet of Things devices.

The term "noisy audio signal" used herein means an audio signal that contains speech of a user and noise, and which is to be enhanced in real-time by a trained ML model.

The term "clean audio samples" used herein means audio signals that only contain speech of individual users, and which are used to train a ML model to perform sound enhancement.

The term "corrupted audio samples" used herein means audio samples that have been generated as part of the process to train a ML model, where the corrupted audio samples are generated by adding at least one noise sample to a clean audio sample.

The term "enhanced audio sample" used herein means the output of the ML model during the training process, where the enhanced audio sample results from using the ML model to enhance a corrupted audio sample.

As will be described in more detail below, the present techniques provide an on-device, real-time sound enhancement approach that is able to extract speech signals of a target user from noisy single-channel audio recordings. A successful deployment of such solutions can improve user-experiences in, for example, telephonic conversation and can improve performance of a downstream automatic speech recognition (ASR) system, especially in noisy conditions. The present techniques combine causal Time-Depth Separable convolution blocks and unidirectional recurrent layers in a novel way to create a Personalized Sound Enhancement Network (PSE-Net) that facilitates a low-latency on-device solution, without degrading the quality of the source extraction. Through a series of evaluation experiments, it is shown that PSE-Net outperforms state-of-the-art solutions in streaming-based sound enhancement, under two types of noise: non-stationary and babble. The impact of sound enhancement is objectively measured by computing word-error-rate in a downstream ASR task, and good transferability of sound-enhancement models across languages is shown.

Figure 1:
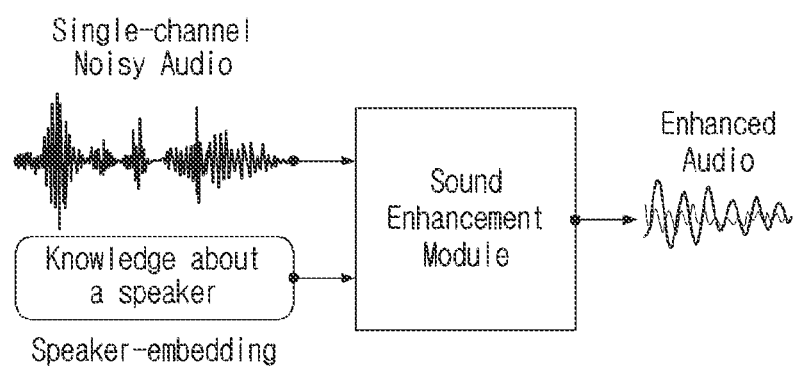
FIG. 1 is a schematic diagram of the sound enhancement approach of the present techniques.

FIG. 1 is a schematic diagram of the sound enhancement approach of the present techniques. Generally speaking, a sound enhancement module of the machine learning model may take as inputs (i) a noisy recording that includes a target user's speech, and (ii) a voice profile for the target user, and may provide as an output an enhanced audio signal that only contains the target user's speech. In other words, noise is removed from the input audio signal.

As mentioned above, there has been a recent focus on speech enhancement research aimed to serve as a pre-processing component to enhance perceptual quality of telephony or the performance of audio related down-stream tasks such as lower WER for ASR.

Though there is a significant body of work aimed at off-line speech enhancement, the pervasive use of audio based applications on mobile and IoT devices is driving research into novel directions to allow for real-time speech enhancement.

Representing the best perceptual and WER quality, but at the cost of model size and real-time, recent work provides significant milestones in improved performance from using bidirectional RNNs operating on the frequency domain to non-causal non-grouped convolutions with non-efficient non-causal self-attention models operating on the time domain.

Improvements based on operating at the time rather than frequency domain at the cost of computational budget are expected, as phase information is used implicitly in the former but not in the latter. Also the use of conformer-like architectures naturally improves enhancement quality, but at the expense of real-time factor and model size requirements.

The present techniques differ from this line of research, as the present techniques operate on frequency-time without any look-ahead, introduce casual grouped convolutions to speech enhancement literature, and leverage RNNs as a novel mechanism to promote smaller model sizes. Operating on the frequency domain allows for a more efficient integration with ASR models, giving the opportunity to avoid duplicated effort in converting from frequency- to time-domain between speech enhancement and ASR models. Nevertheless, the ideas presented here could also serve to model time domain signals, by increasing convolution dilations.

On the other hand, models suitable for real-time (or near real-time with a small look-ahead) represent only a fraction of recent work and have mostly been formed of unidirectional RNNs such as the seminal work. The present techniques differ from these developments by leveraging grouped convolutions to decrease the number of model parameters, as well as by the use of unidirectional RNNs to allow further reduction of the filter sizes in the convolutions, thereby further decreasing model size compared to what would otherwise be possible.

While there is already significant recent work on this front there is still a considerable gap in performance when compared with non-real-time speech enhancement models, indicating perhaps that there is a wide possibility for improvement. Great strides have recently been made in the miniaturizations of speech enhancement models, but at the cost of real-time solutions or quality.

The present techniques differ from these efforts by preserving enhancement quality in a way that is comparable with non-real time solutions. This is achieved even though the ML model of the present techniques does not require any look-ahead. Furthermore, the ML model yields a small enough model footprint that makes the present techniques suitable for implementation on resource-constrained devices (such as mid-range or high-end smartphones).

The present techniques provide a real-time personalized sound enhancement approach that extracts the speech signal of a target user from a noisy single-channel audio recordings on mobile and wearable devices. A successful on-device deployment of a personalized sound enhancement has important product implications, including:

improved audio call quality, where user's noisy data is cleaned on-device and then transmitted to the far-end listener; and improved usability of services, like automatic speech recognition (ASR), by decreasing the word-error-rate under noisy conditions.

Lately, deep learning techniques have been successfully applied in speech enhancement tasks, e.g., to solve the well-known blind-source separation problem. However, a successful solution to the blind source separation problem needs to address two main challenges: (i) identify the total number of speakers or sound sources present in a recorded audio, and (ii) be invariant to the permutation of the identified source-labels during training. Interestingly, sound enhancement on personal devices can often be reduced to the problem of sound extraction, where the identity of the target or source speaker is known a priori, e.g., the owner of the device.

The present techniques focus on sound enhancement, where the main objective is to extract audio pertaining to the speech of a target user. The sound enhancement may be personalised or non-personalised, as mentioned above, and the same ML model may be able to switch between performing personalised and non-personalised sound enhancement. The personalisation may be performed by conditioning the output of a source extractor network on a voice profile of the target user, represented by a fixed-size embedding vector. To measure the impact of the sound enhancement technique, ASR is considered to be the downstream task. Despite best efforts, ASR performance remains poor in noisy and crowded environments and personalised sound enhancement could potentially increase ASR robustness in many applications including personal assistants, car navigation, robots, and medical dictation devices.

In spite of the progress made in sound extraction methodologies, there exists a considerable gap in the performance of real-time streaming sound enhancement solutions, compared to their non-causal alternatives. To bridge this gap, the present Applicant explores the use of causal Time Depth Separable (TDS) convolution blocks with unidirectional RNNs to form an encoder-decoder architecture that (a) operates in streaming mode, (b) shows superior Signal-to-Distortion Ratio (SDR), and (c) achieves lower word-error-rate (WER) when applied to a downstream ASR task.

The present techniques address the following main technical challenges: Suppresses both background chatter and non-stationary ambient noise, while keeping the target speaker's audio intact.

Does not degrade spectrogram representation of the clean input audio after enhancement, i.e., almost no changes are made to clean input audio.

Supports real-time operations, i.e., the proposed solution operates in streaming mode and has a small latency.

Performs causal prediction, i.e., it only considers past information while predicting denoising input audio recordings.

The present techniques combine causal Time-Depth Separable (TDS) convolution blocks and unidirectional recurrent layers in a novel way to facilitate lower latency, without degrading the performance of the source extraction module. This is the first real-time sound enhancement solution that uses a mixture of causal TDS convolution blocks and unidirectional RNN layers in the domain of real-time frame-in frame-out personalized sound enhancement.

To achieve the goal of finding a small model, in terms of overall parameter size, as well as supporting real-time operations with very small latency, at the same time without compromising on the enhancement quality, is a non-trivial technical problem. The present techniques are advantageous because they provide a solution that simultaneously meets all the criteria (i.e. the technical challenges mentioned above).

Advantages of the present techniques include:

The use of causal grouped convolutions to decrease the amount of parameters in the model by a factor of 10 to 50 times.

The use of an encoder/decoder architecture, where speaker embeddings are used not only after the end of the encoder and before the start of the decoder, but instead both at the end of the encoder and the end of the decoder. State-of-the-art literature indicates one place conditioning on bottleneck layers is enough for effective solutions, but the present applicant demonstrates this is not the case for lightweight models.

The use of shallow and therefore lightweight unidirectional RNNs as an effective means to reduce the kernel size as well as the dilations used in the grouped convolutions. This enables over 10× compression in model size to be achieved (making the model suitable for implementation on resource-constrained devices).

Finally, although the ultimate goal is to create enhancement models that have effective inference with low latency and small model size, the proposed solution is as fast to train as the state of the art in terms of training time offered by dual path solutions, which makes the optimization of such models, such as hyper-parameter tuning or neural architecture search related technologies more scalable to tackle on.

As explained below in more detail, the main contributions of the present techniques include PSE-Net—a fully streamable, on-device personalised sound enhancement network, which is designed with TDS cells and recurrent layers to meet memory and latency requirements. Extensive evaluation of the proposed PSE-Net model is presented by measuring SDRi and WER performances when used in conjunction with an open source ASR system. Furthermore, language shift is analysed for models trained on English and evaluated (for SDRi and WER) on Spanish, German, and English. This sheds light on how sound enhancement systems trained on high resource public data are able to transfer to unseen structurally different languages.

Figure 2:
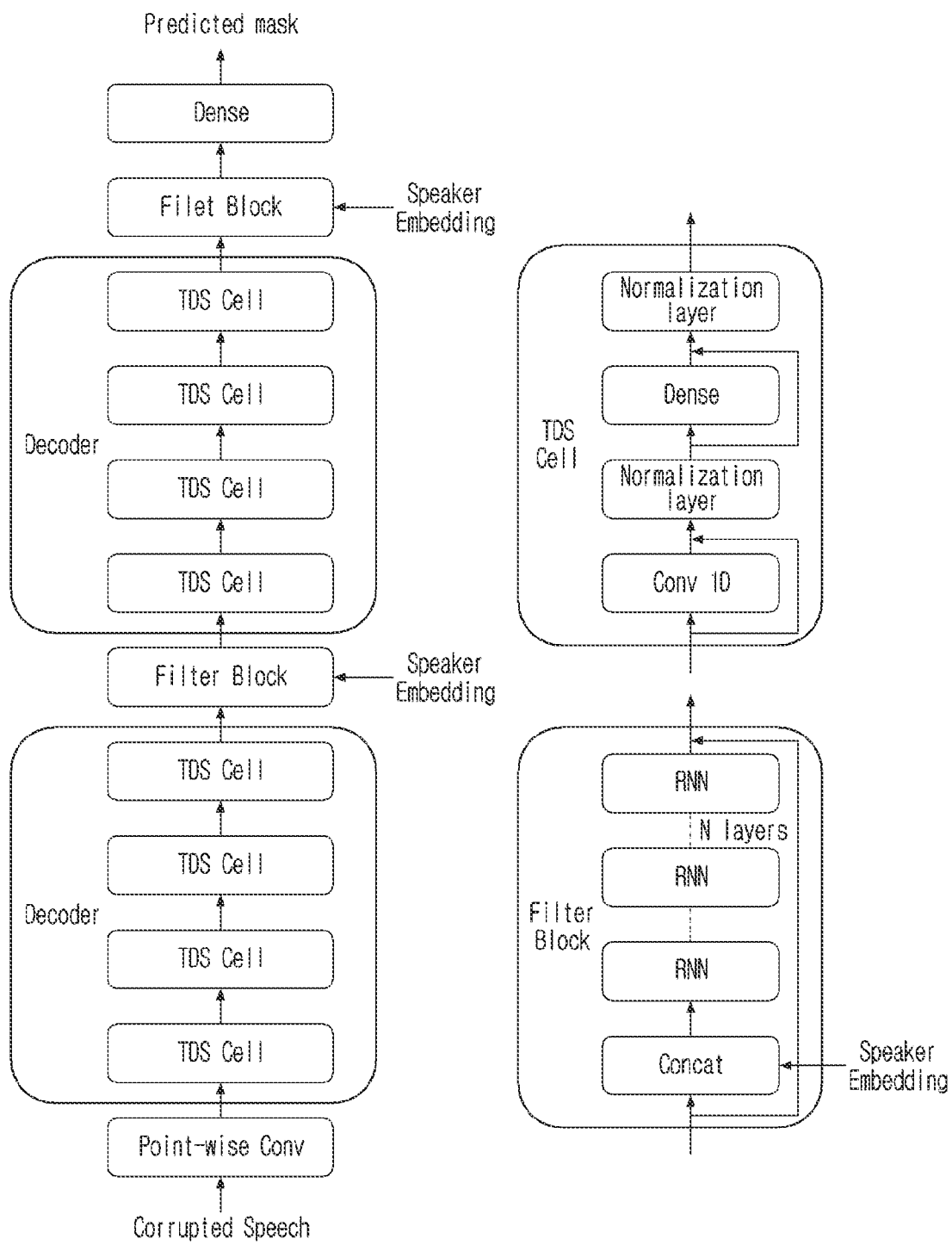
FIG. 2 is a schematic diagram showing the architecture of the machine learning, ML, model of the present techniques.

Architecture. FIG. 2 is a schematic diagram showing the architecture of the machine learning, ML, model of the present techniques. The ML model (also referred to herein as "PSE-Net") accepts (i) a noisy spectrogram and (ii) speaker-embedding of a target user as inputs and outputs a time-frequency mask, which is then applied on the input audio spectrogram to obtain the enhanced spectrogram. As shown in FIG. 2, the model comprises an encoder and decoder style network with intermediate filter blocks. Finally, there is a fully-connected layer with sigmoid activations to generate the final output mask.

Encoder and Decoder. Both encoder and decoder are composed of four time-depth-separable convolution (TDS) cells. A TDS cell (as shown on top right of FIG. 2) starts with 1-D convolution that operates an input tensor of shape T×F and produces an output tensor of the same shape. Here, T is the number of time-steps and F is the number of channels, i.e., features. Scaled Exponential Linear Unit (SeLU) is used as the activation of the convolution layer, which alleviates the issue of dead nodes during back propagation. Finally, residual connections are added and layer normalization is applied. The output is then passed through a fully-connected layer with F units, such that the output shape of the cell remains identical to the input shape. The output from the fully connected layer is added with a residual connection and a layer normalization is applied.

A kernel size of 7 and 10 groups is used in all cells, which helps in significantly reducing the network size. In order to obtain the same output shape from 1-D convolution without any future look-ahead, left-padding is performed using the very first frame of the input. For example, if the input frames are {t1, t2, ..., tn}, they are padded with six frames on the left as follows: {t1, t1, t1, t1, t1, t1, t1, t2, tn}.

Filter Block. A filter block with N recurrent layers is designed, with a residual connection added at the end. Before passing the input to the filter block, each time frame is concatenated with a vector representing the speech profile of the target user. When the speech profile of the target user is known, each time frame is concatenated with a speaker embedding vector; when the speech profile of the target user is not known, each time frame is concatenated with a zero vector. It is assumed that the speaker embedding vector is pre-computed using a speech recognition model, such as an X-Vector model, from utterances of a target user during an enrolment phase, and thus no additional computations are needed during the sound extraction phase.

Figure 3:
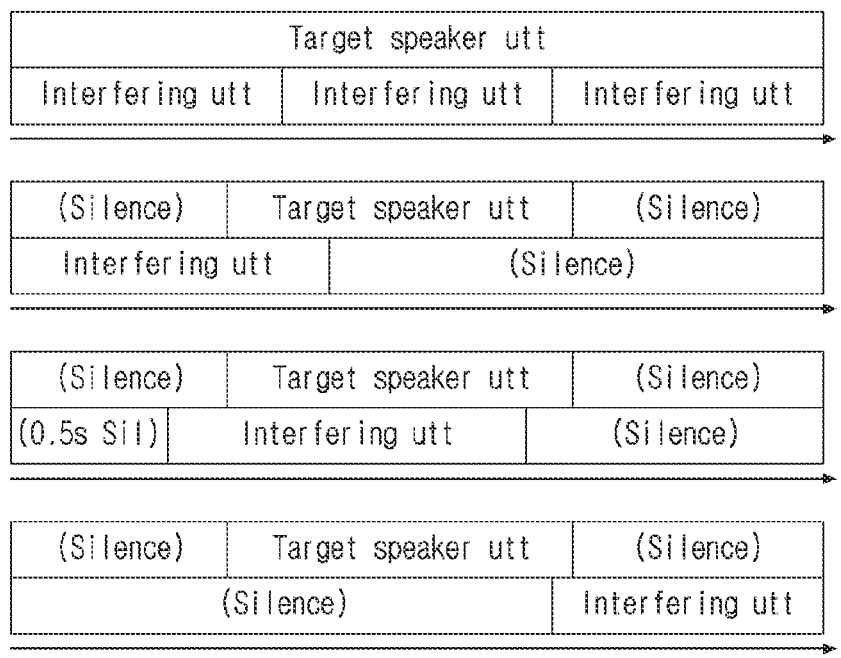
FIG. 3 is a diagram showing data augmentation schemes deployed during training of the machine learning, ML, model.

Model training/inference pipeline. To improve the generalizability of the sound enhancement model, a data augmentation technique covering two noise types is introduced: (a) interfering utterance from a different speaker, i.e., babble noise, and (b) common non-speech environmental noise. The noise signals are mixed with the clean audio to reflect four common scenarios with interfering signal: (i) present throughout target utterance, (ii) occurring briefly within the target and corrupting a subsegment, (iii) starting before the target utterance but stopping before target utterance completion and (iv) vice-versa. FIG. 3 shows these scenarios. Lastly, interference augmentation is made stochastic by scaling the interference based on a target signal-to-noise (SNR) level chosen randomly for each utterance during the training phase. In addition to the corrupted input, the data pipeline of the present techniques also stochastically includes clean input (without any corruption) to allow the network to learn pass-through behaviour.

Figure 4:
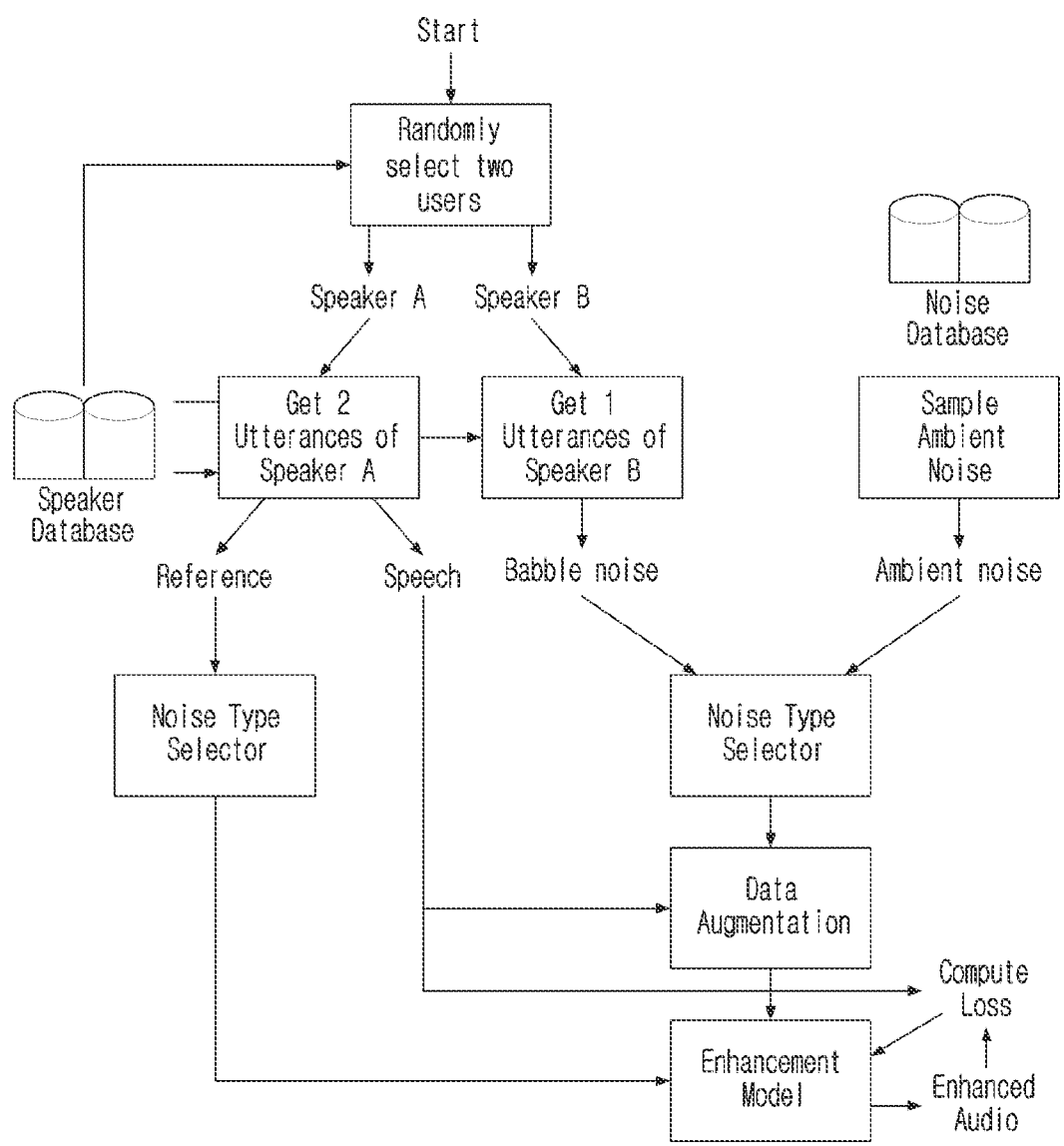
FIG. 4 is a block diagram of the mechanism for data augmentation for ML model training.

FIG. 4 is a block diagram of the mechanism for data augmentation for ML model training. The diagram shows the data augmentation technique used to help achieve generalizable sound enhancement model.

Figure 5:
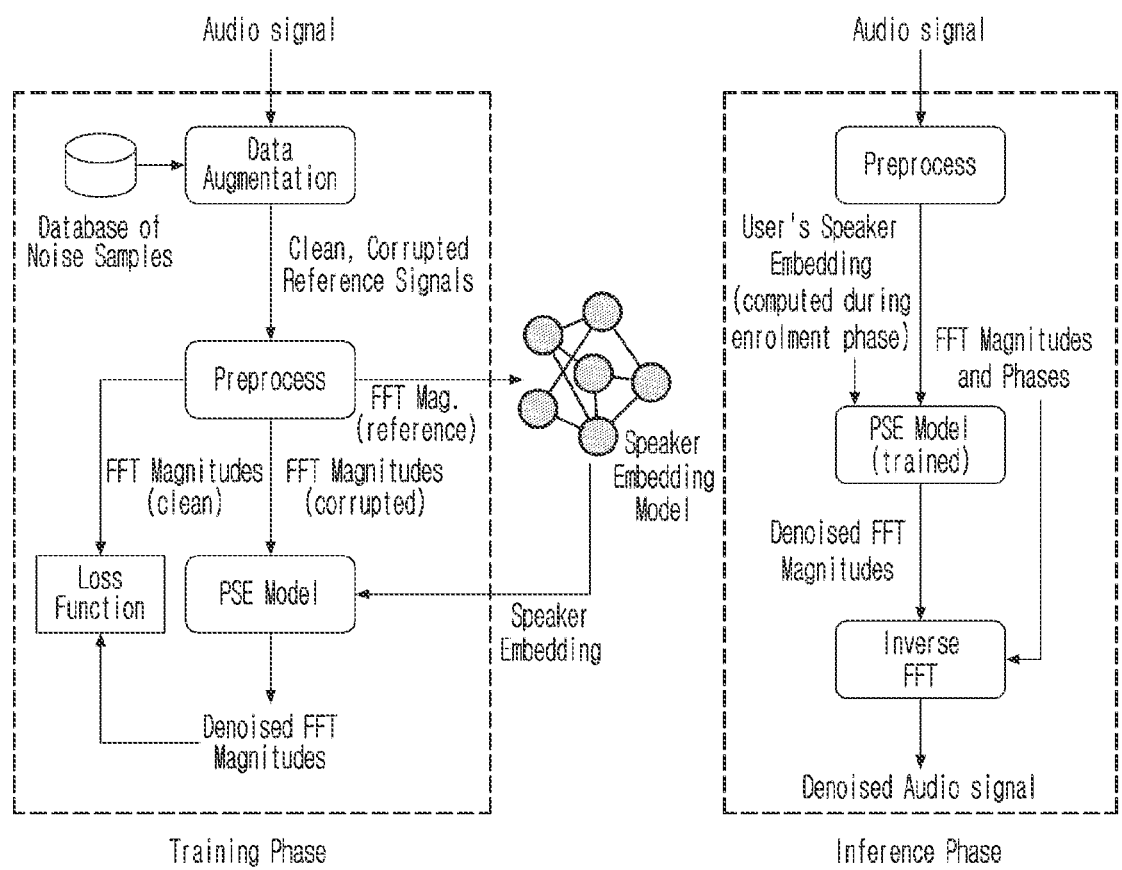
FIG. 5 is a schematic diagram showing ML model training and the use of the trained ML model.

FIG. 5 is a schematic diagram showing ML model training and the use of the trained ML model. In other words, FIG. 5 shows the detailed pipeline for training and inference phases.

Figure 6:
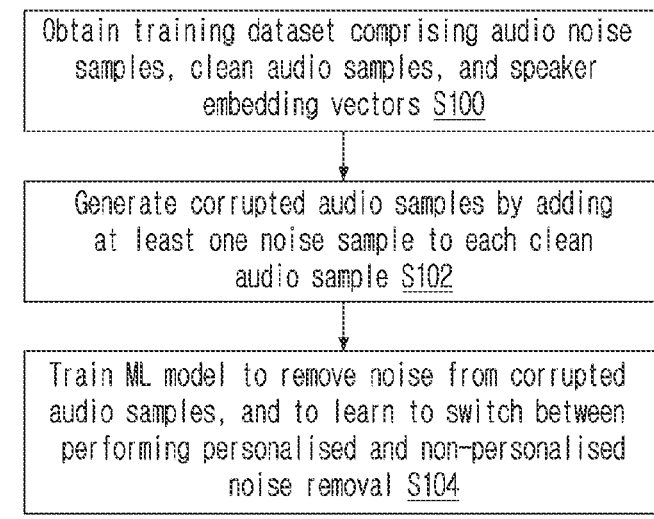
FIG. 6 is a flowchart of example steps for training the ML model using a remote server.

FIG. 6 is a flowchart of example steps for training an ML model to perform real-time personalised or non-personalised sound enhancement for a target user. The steps shown in FIG. 6 may be performed off-device (i.e. off of the end user device where the trained ML model is deployed), such as on a remote server.

The method comprises obtaining a training dataset comprising a plurality of audio noise samples, and a plurality of clean audio samples that each contain speech of individual speakers, and a speaker embedding vector for each individual speaker (step S102). The clean audio samples may be captured from a plurality of speakers. The clean audio samples $x \in R^{(t-1)}$ may be captured in the time domain, and may first be converted to the frequency domain $z = \rho \odot e^{i\phi}$, where $z \in \mathbb{C}^{r^*F}$, $\rho \in R_+^{r^*f}$, and $\phi \in [-\pi, \pi]^{r^*j}$.

The method comprises generating, using the clean audio samples, corrupted audio samples by adding at least one noise sample to each clean audio sample (step S102). The generated corrupted samples $\tilde{x} \in R^{r*1}$ (i.e., clean sample augmented with noise) may also be converted to the frequency domain $\tilde{z}$. As the ML model of the present techniques enhances only the magnitude information $\tilde{\rho}$, the enhanced signal obtained is therefore $\hat{z} = f_\theta(\tilde{\rho}) \odot \tilde{\rho} \odot e^{i\tilde{\phi}}$, where $f_\theta(\tilde{\rho}) \in (0, 1)^{r^*j}$ denotes the causal frame-in frame-out PSE-Net, which represents magnitude based frequency masking. Note that when applying a Short-Time Fourier Transform (STFT), a window length of 32 ms and a stride of 16 ms may be used.

Step S102 to generate corrupted audio samples may comprise entirely overlaying the speech in a clean audio sample with an audio noise sample. Additionally or alternatively, generating the corrupted audio samples may comprise partially overlaying the speech in a clean audio sample with an audio noise sample.

The method may comprise training neural networks of the ML model, using the training dataset and the corrupted audio samples, to remove the noise from the corrupted audio samples while maintaining the speech of the individual speakers, and to learn to switch between performing personalised and non-personalised noise removal depending on whether the speaker embedding vector for an individual speaker is available during a training round (step S104). The model may be optimised with an objective to minimise the differences between the clean signal z and enhanced signal $\hat{z}$. This could be achieved by minimising the discrepancies between the clean magnitude $\rho$ and the enhance magnitude $f_\theta(\tilde{\rho}) \odot \tilde{\rho}$, i.e., the Mean Squared Error (MSE):

$$\|\rho - f_\theta(\tilde{\rho}) \odot \tilde{\rho}\|_2^2 = \sum_{i,j} ([\rho]_{i,j} - [f_\theta(\tilde{\rho}) \odot \tilde{\rho}]_{i,j})^2$$

It has been found that, if rather than magnitudes the normalized magnitudes are operated on in (0,1), then convergence speed can be increased if instead a power in the MSE is minimised, namely:

$$\sum_{i,j} ([\rho]_{i,j}^\alpha - [f_\theta(\tilde{\rho}) \odot \tilde{\rho}]_{i,j}^\alpha)^2$$

for α varying during training according to a decreasing scheduler from $\alpha_{begin}$ to $\alpha_{end}$. The intuition is that for normalised magnitudes, a higher value of α will force the training to focus on decreasing larger discrepancies, whereas a lower value of α will encourage the training to decrease large and small errors similarly. This shift in focusing on more important rather than generic errors, increased convergence speed substantially which was an important factor in scaling the hyper parameter optimization experiments.

Step S104 to train neural networks of the ML model may comprise: inputting the corrupted audio sample into an encoder module of the ML model; concatenating a vector with each frame of the corrupted audio sample after processing by the encoder module, to generate a modified corrupted audio sample (as shown in FIG. 2); inputting the modified corrupted audio sample into a decoder module of the trained ML model; and concatenating the vector with each frame of the modified corrupted audio signal after processing by the decoder module (as shown in FIG. 2), to output an enhanced audio sample.

When the speaker embedding vector exists during a training round, the vector is the speaker embedding vector and the ML model switches to perform personalised noise removal. In this case, the model learns to remove ambient noise and/or babble noise from the output enhanced audio sample, while maintaining the speech of the target user.

Alternatively, when no speaker embedding vector exists, the vector is a zero vector and the ML model switches to perform non-personalised noise removal. In this case, the model learns to remove only ambient noise from the output enhanced audio sample, while maintaining the speech of the target user.

Step S104 to train neural networks of the ML model may comprise: comparing each outputted enhanced audio sample with the corresponding clean audio sample and determining how well the outputted enhanced audio sample matches the corresponding clean audio sample; determining, using a result of the comparing, a loss function for training the neural networks; and updating the neural networks to minimise the loss function.

Additionally or alternatively, step S104 to train neural networks of the ML model may comprise: applying an automatic speech recognition model to each clean audio sample to obtain a transcript of the speech; applying the automatic speech recognition model to each outputted enhanced audio sample to obtain a transcript of the speech; comparing the transcript of the speech from the outputted enhanced audio sample with the transcript of the speech from the corresponding clean audio sample and determining how well the transcript from the outputted enhanced audio sample matches the transcript from the corresponding clean audio sample; determining, using a result of the comparing, a loss function for training the neural networks; and updating the neural networks to minimise the loss function. Preferably, determining a loss function comprises determining a word-error-rate for the transcript of the speech from the generated enhanced audio sample.

The method may further comprise transmitting the trained (pre-trained) ML model to at least one user electronic device for use (not shown in FIG. 6).

Figure 7:
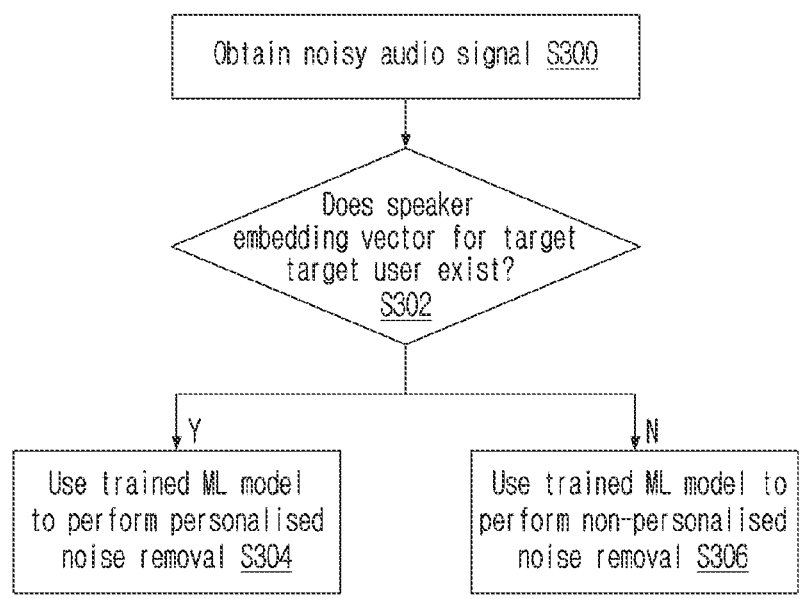
FIG. 7 is a flowchart of example steps for using the trained ML model on-device.

FIG. 7 is a flowchart of example steps for using the trained ML model on-device to perform real-time sound enhancement for a target user. The method may comprise: obtaining a noisy audio signal comprising speech of a target user and noise (step S300).

The method may comprise determining whether a speaker embedding vector for the target user exists (step S302). As mentioned above, the presence of a speaker embedding vector determines whether the sound enhancement performed by the ML model is personalised or non-personalised.

The method may comprise using neural networks of the trained ML model, to remove the noise from the noisy audio signal while maintaining the speech of the target user by switching the trained ML model to perform personalised noise removal when the speaker embedding exists (step S304) or to perform non-personalised noise removal when no speaker embedding vector exists (step S306).

Using the trained ML model to perform personalised noise removal (step S304) may comprise: inputting the corrupted audio signal into an encoder module of the trained ML model; concatenating a speaker embedding vector with each frame of the noisy audio signal after processing by the encoder module, to generate a modified noisy audio signal; inputting the modified noisy audio signal into a decoder module of the trained ML model; and concatenating the speaker embedding vector with each frame of the modified noisy audio signal after processing by the decoder module, to output an enhanced audio signal. In this case, ambient (environmental) noise and/or babble noise is removed from the output enhanced audio signal, while maintaining the speech of the target user.

Using the trained ML model to perform non-personalised noise removal (step S304) may comprise: inputting the corrupted audio signal into an encoder module of the trained ML model; concatenating a zero vector with each frame of the noisy audio signal after processing by the encoder module, to generate a modified noisy audio signal; inputting the modified noisy audio signal into a decoder module of the trained ML model; and concatenating the zero vector with each frame of the modified noisy audio signal after processing by the decoder module, to output an enhanced audio signal. In this case, only ambient noise is removed from the output enhanced audio signal, while maintaining the speech of the target user.

The corrupted audio signal may be obtained during an audio call. The method may further comprise transmitting the audio signal after processing by the trained ML model to another participant in the audio call. Thus, the 'cleaned-up' audio signal is transmitted to the listener(s) in the audio call (instead of the noisy signal), thereby improving the sound quality of the audio call for the listener(s). It will be understood that the noisy signal could equally be obtained during an audio call from another participant in the audio call, and in this case, the noisy signal may be cleaned/denoised before the user hears the audio signal. Thus, as noted above, in the context of an audio call, the noisy audio signal that is enhanced in real-time may be the audio signal of the user that is sent to another participant or is the audio signal of the other participant that is sent to the user.

The method may further comprise inputting the audio signal after processing by the trained ML model into an automatic speech recognition, ASR, system. Thus, the 'cleaned-up' audio signal may be easier to process by the ASR system and may result in a lower word error rate.

Figure 8:
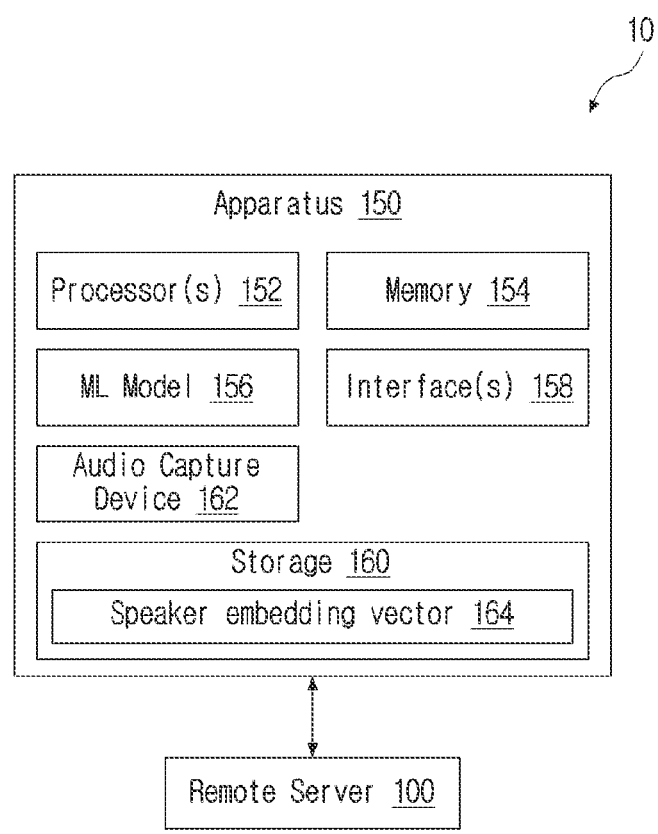
FIG. 8 is a block diagram of a system for training a machine learning, ML, model to perform real-time personalised sound enhancement for a target user.

FIG. 8 is a block diagram of a system 10 for training a machine learning, ML, model to perform real-time sound enhancement for a target user.

The system 10 comprises a server 100 arranged to perform the steps described above with reference to FIG. 6 to generate a trained ML model.

The system 10 comprises an apparatus 150 used to implement the trained ML model. The apparatus 150 may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, or a smart consumer device (such as a smart fridge). It will be understood that this is a non-exhaustive and non-limiting list of example apparatus.

The server 100 is communicatively coupled to the apparatus 150, and is able to transmit the trained ML model to the apparatus 150.

The apparatus 150 comprises at least one processor 152 coupled to memory 154. The at least one processor 152 may comprise one or more of: a microprocessor, a microcontroller, and an integrated circuit. The memory 154 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The apparatus 150 may comprise storage 160 which may store a trained ML model 106. The trained ML model 106 is the model obtained from the server 100.

The apparatus 150 may comprise an audio capture device 162 for capturing sound/audio signals which are to be processed by the trained ML model 106. The apparatus 150 may comprise an interface 158 (e.g. a communication interface) for transmitting audio signals after they have been processed by the trained ML model 106. For example, an noisy audio signal may be captured by the audio capture device 162 during an audio call made using the apparatus. The processor may be arranged to transmit the audio signal after processing by the trained ML model to another participant (not shown) in the audio call. Similarly, interface 158 may be able to receive audio signals obtained from another participant in an audio call. The trained ML model may be able to enhance noisy audio signals received from another participant in an audio call, as described above. This may enable the user of apparatus 150 to hear enhanced versions of the noisy audio signals received from the other participant in the audio call, thereby improving the audio quality of the sound the user of apparatus 150 hears.

The at least one processor 152, coupled to memory 154, may be arranged to: obtain, from the audio capture device 158, a noisy audio signal comprising speech of a target user and noise; determine whether a speaker embedding vector for the target user exists; and use neural networks of the trained ML model 106, to remove the noise from the noisy audio signal while maintaining the speech of the target user by switching the trained ML model 106 to perform personalised or non-personalised noise removal depending on whether the speaker embedding vector exists.

Evaluation of PSE-Net.

Integration with ASR: Publicly available pre-trained enterprise-grade automatic speech recognition (ASR) models are used, which are available for English, German and Spanish languages ("Silero models: pre-trained enterprise-grade stt/tts models and benchmarks," https://github.com/snakers4/silero-models, 2021). After enhancing the frequency-domain signal magnitude with PSE-Net, the output is converted to the time-domain, using the corrupted frequency-domain signal phase, and it is then passed through the ASR models. The output of the ASR models is then compared with the ground-truth transcripts to compute the word error rate (WER) results.

Thus, as mentioned above, training neural networks of the ML model may comprise: applying an automatic speech recognition model to each reference audio sample to obtain a transcript of the speech; applying the automatic speech recognition model to each generated enhanced audio sample to obtain a transcript of the speech; comparing the transcript of the speech from the generated enhanced audio sample with the transcript of the speech from the corresponding reference audio sample and determining how well the transcript from the generated enhanced audio sample matches the transcript from the corresponding reference audio sample; and determining, using a result of the comparing, a loss function for training the neural networks.

Dataset: The training dataset used to train the ML model of the present techniques is constructed from LibriSpeech (V. Panayotov, G. Chen, D. Povey, and S. Khudanpur, "Librispeech: an ASR corpus based on public domain audio books," in ICASSP, 2015), 100 h and 360 h training splits, which contain clean speech. Since in addition to speech and text, the LibriSpeech dataset contains speaker identifier, tuples $(r,z,\tilde{z})$ are built, where r, z, and $\tilde{z}$ respectively denote reference, clean and corrupted signal of a speaker. To evaluate the PSE-Net model with ASR integration, test-clean split of LibriSpeech is used for English ASR model. For Spanish and German ASR models, test-split of VoxForge dataset is used, which is equivalent to 20% split ensuring each user's data is only in one split ("VoxForge Corpus," http://www.voxforge.org, 2006).

Baselines. The proposed causal frame-in frame-out PSE-Net model was compared against the state-of-the-art (SOTA) causal frame-in frame-out VoiceFilter-Lite model (Q. Wang, I. L. Moreno, M. Saglam, K. Wilson, A. Chiao, R. Liu, Y. He, W. Li, J. Pelecanos, M. Nika, and A. Gruenstein, "VoiceFilter-Lite: Streaming Targeted Voice Separation for On-Device Speech Recognition," in Interspeech, 2020). Several VoiceFilter-Lite model variations were trained and the model yielding the best signal-to-distortion ratio improvement (SDRi) and WER results was chosen for the comparison experiments, even though the model choice exceeds the memory limitations for embedded deployment. In addition, results of SOTA in non-causal model is presented, namely the VoiceFilter (VF) model (Q. Wang, H. Muckenhirn, K. Wilson, P. Sridhar, Z. Wu, J. R. Hershey, R. A. Saurous, R. J. Weiss, Y. Jia, and I. L. Moreno, "VoiceFilter: Targeted Voice Separation by Speaker-Conditioned Spectrogram Masking," in Interspeech, 2019) to compare the real-time results of PSE-Net with a strong non-realtime baseline. As the representative audio degradation schemes, in the experiments presented here, only consider additive babble and ambient noise are considered.

FIG. 9 is a table showing SDRi results for the trained ML model and baseline models assessed across different languages, under ambient noise and babble. As an imperfect replacement for perceptual audio quality metric, the Signal-to-Distortion Ratio improvement (SDRi) metric is used to measure the objective quality of the enhanced signal. As shown in FIG. 9 (under the "English" column), all three top performing PSE-Net models outperform SOTA VoiceFilter-Lite model for enhancing speech corrupted with both noise types. Specifically, the best PSE-Net model (highlighted in bold) achieves 9.36 and 12.60 SDRi for suppressing babble and ambient noises respectively. Additionally, it is shown that the performance of PSE-Net is close to the VoiceFilter model. Moreover, the SDRi is overall better (i.e., higher) for denoising ambient noise compared to babble noise. This is in-line with previous studies which have shown that it is difficult to suppress babble noise compared to ambient noise. It has been found, by searching for different parameters, that increasing model complexity does not necessarily lead to better model performance.

The inference latency of PSE-Net was also measured on NVIDIA Jetson Nano as a representative mobile platform and NVIDIA GeForce GTX 1080 Ti for a non-embedded comparison. It was found that the three PSE-Nets perform speech enhancement with a RT-factor of 0.71-0.84× on Jetson Nano, and 0.23-0.27× on GeForce GTX 1080 Ti. All PSE-Net models have 10-14M parameters.

FIG. 10 is a table showing the impact of the models of FIG. 9 on word error rate in automatic speech recognition tasks. To quantify the effectiveness of PSE-Net on downstream ASR tasks, the improvement in word-error-rate (WER) was measured when passing the enhanced speech, as opposed to the corrupted speech, through an ASR model. The open source Silero ASR models mentioned above were used for three languages and WER comparison results are presented in FIG. 10 under clean, babble and ambient noise conditions. The results show that all PSE-Net variants can effectively suppress both babble and ambient noise, and outperform SOTA VoiceFilter-Lite model with a significant margin. In particular, it can be seen that PSE-Net models perform close to VoiceFilter (non-causal) model within a 4% WER absolute difference, which is 5.5× better compared to VoiceFilter-Lite incase of babble noise. Similarly, for ambient noise there is a 1.7× improvement with PSE-Net over VoiceFilter-Lite and only a 1.4% WER absolute different to VoiceFilter. It can be seen that the model achieving best SDRi is also the best for downstream ASR task. However, no significant correlation has been found between the SDRi and WER metrics. Overall, the best PSE-Net model achieves 69.6% and 3.1% absolute improvement in WER for English under babble and ambient noise. The results also show a negligible hit on the ASR WER when enhancing a clean signal (i.e. reference audio sample), and this oversupression is inline with the findings of existing studies.

Figure 11:
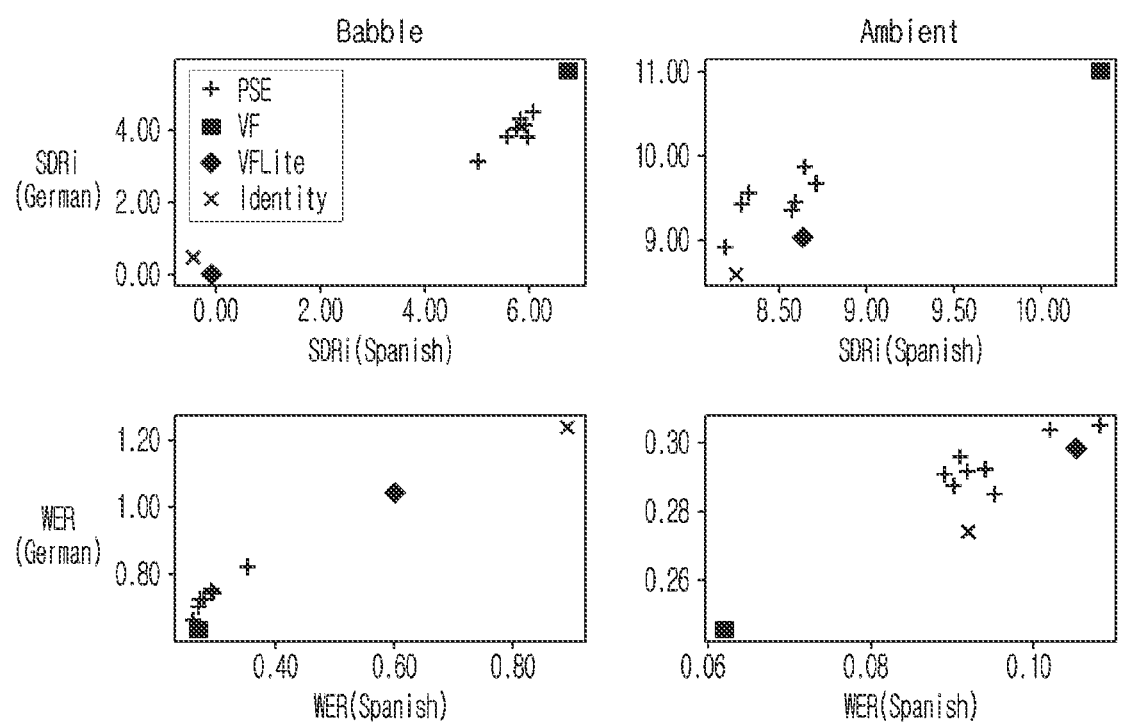
FIG. 11 show plots of SDRi and word error rates (WER) for Spanish and German audio that has been passed through speech enhancement models trained on English speech.

The performance of speech enhancement models trained on English, but applied to other languages, was also investigated. Specifically, the performance of PSE-Net, which has been trained using English audio speech samples, was evaluated on noisy Spanish and German speech signals. FIG. 1 show plots of SDRi and word error rates (WER) for Spanish and German audio that has been passed through speech enhancement models trained on English speech. The plots on the left-hand side in FIG. 11 show the results for babble suppression, while the plots on the right-hand side show the results for ambient noise suppression. It can be seen that the PSE-Net trained on English performs well when used for enhancing Spanish and German speech. This is encouraging from a practical point of view, since it highlights the potential of applying speech enhancement in a language-agnostic manner Specifically, with Spanish dataset, 5-6 and 8-9 SDRi is observed after enhancing signals corrupted with babble and ambient noises. With German dataset, around 4 and 9-10 SDRi is observed after suppressing babble and ambient noises. Overall, the results show that there is a significantly large improvement over SOTA VoiceFilter-Lite model, even when both models are trained with similar settings.

In case of ASR, the presence of babble noise has a much bigger impact, and with PSE-Net the ASR performance could be significantly improved in such conditions. Specifically, a 60-61% and 50-56% absolute improvement is observed in WER for Spanish and German languages. Overall, the results show PSE-Net has great potential for transferability of personalized speech enhancement across languages. Compared to the VoiceFilter-Lite model, which fails to perform effectively on languages other than what it was trained for, PSE-Net shows a great potential for successfully transferring speech enhancement system across languages. Furthermore, it is observed that PSE-Net performs similarly to the non-causal VoiceFilter model, especially for babble noise.

In FIG. 11, the correlation between English speech enhancement models being applied to Spanish and German languages for SDR and WER improvements is shown. The top seven PSE-Net models (from all models trained during hyper-parameter optimisation) were selected for this analysis, as well as the VoiceFilter-Lite and the VoiceFilter model. The results show there is a preservation of the model ranking in terms of both SDRi and WER, when applied to Spanish and German. Additionally, the various PSE-Net architectures offer different performance/computation budgets decreasing the gap to non-causal VoiceFilter.

Note the performance of PSE-Net is not perfect when transferred to other languages. This could be due to the fact that VoxForge dataset splits are leveraged for Spanish and German, and the recordings for German dataset are somewhat far-field, whereas Spanish recordings are mainly close-field. This provides an additional dimension to the analysis, which should favour transfer to close-field given the present speech enhancement models are trained on LibriSpeech dataset which is mainly close-field. Indeed, FIGS. 9 and 10 capture this phenomenon which might also be due to variability of voice characteristics between native German speaking people than native Spanish speaking people.

Figure 12:
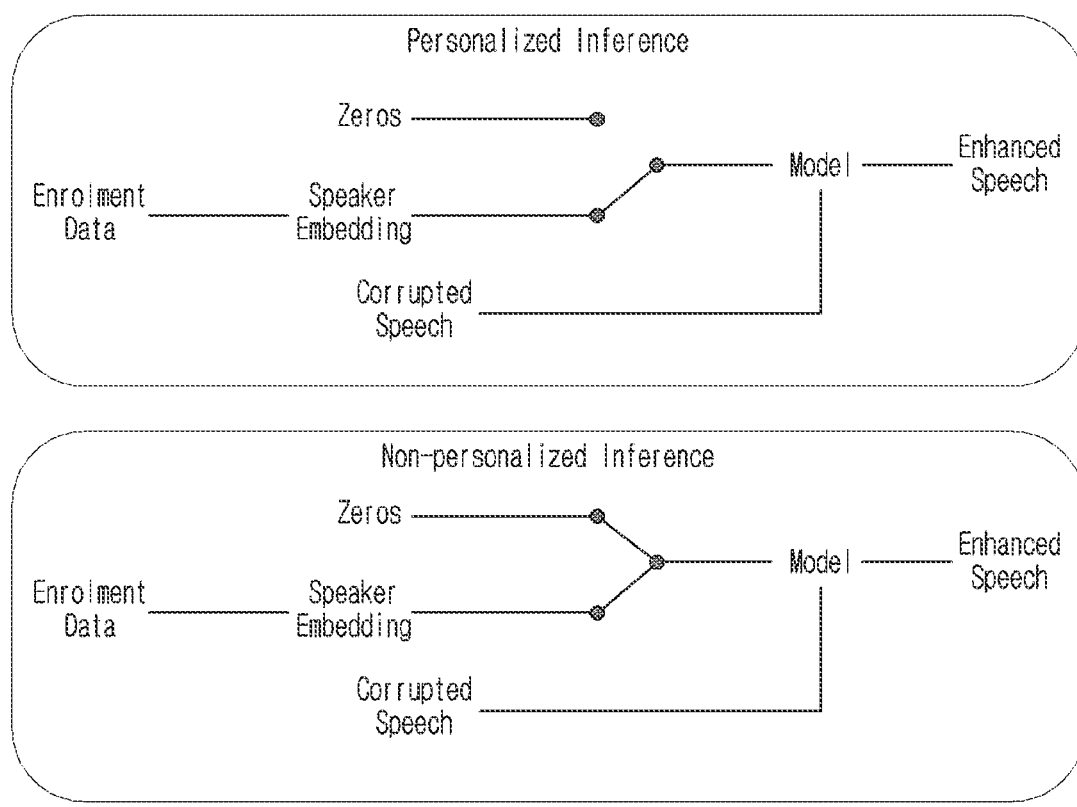
FIG. 12 is a block diagram illustrating how the ML model switches between performing personalised and non-personalised sound enhancement.

FIG. 12 is a block diagram illustrating how the ML model switches between performing personalised and non-personalised sound enhancement. As explained above, there are two inputs into the ML model that performs speech enhancement (both during training time and during inference time). If a speaker embedding vector for a particular user exists, then the speaker embedding vector and the corrupted speech (noisy audio signal) is input into the ML model; and if no such speaker embedding vector exists, then a zero vector and the corrupted speech is input into the ML model. Whether the speaker embedding vector exists depends on whether a user has provided enrolment data, i.e. has taken part in an enrolment process to provide a sample of their voice (i.e. a clean audio signal containing just the user's voice). This enrolment process only needs to be performed once per user. It is possible to use the trained ML model to perform sound enhancement before this enrolment process is performed because, as shown in FIG. 12, the ML model simply switches to performing non-personalised sound enhancement instead.

Figure 13:
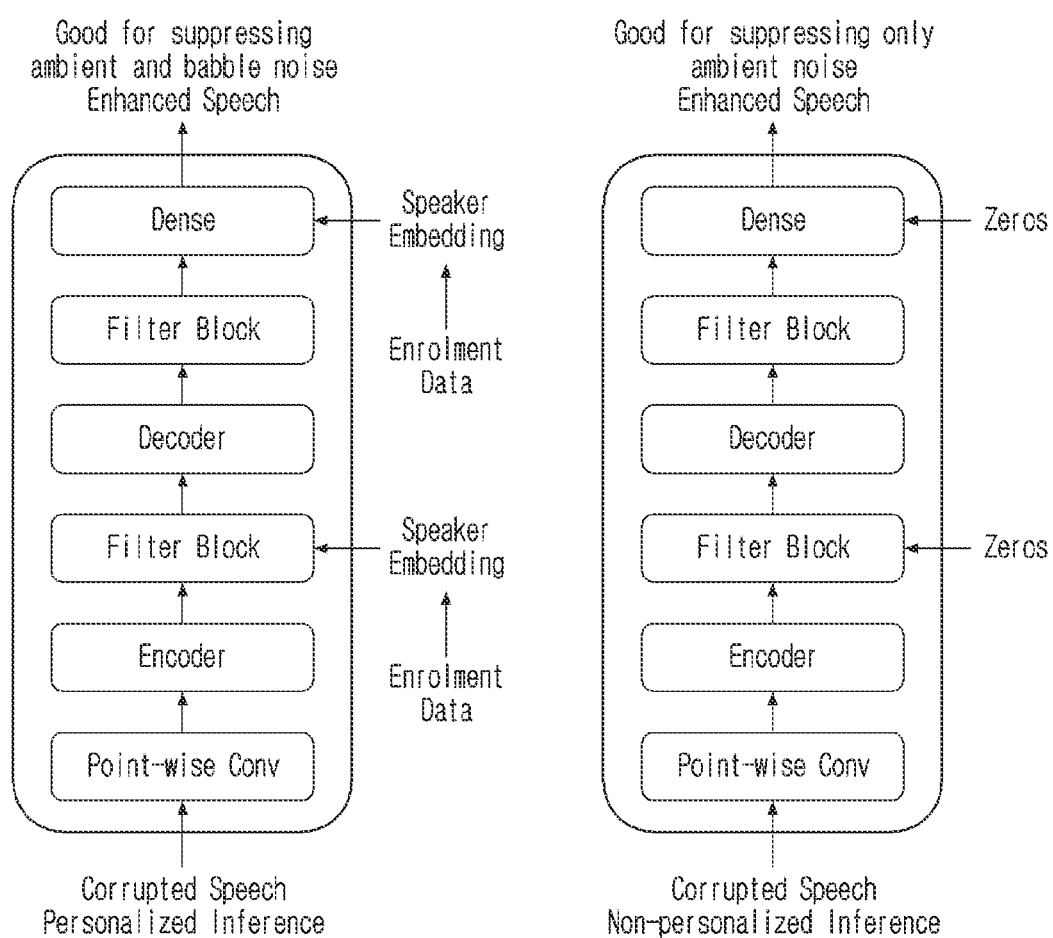
FIG. 13 is a schematic diagram showing how the architecture illustrated in FIG. 2 is used to perform personalised and non-personalised sound enhancement.

FIG. 13 is a schematic diagram showing how the architecture illustrated in FIG. 2 is used to perform personalised and non-personalised sound enhancement. As explained above, when the speaker embedding vector exists (left hand side), the trained ML model is switched to perform personalised noise removal and, in this case, using neural networks of the trained ML model to remove the noise comprises: inputting the noisy audio signal into an encoder module of the trained ML model; concatenating the speaker embedding vector with each frame of the noisy audio signal after processing by the encoder module, to generate a modified noisy audio signal; inputting the modified noisy audio signal into a decoder module of the trained ML model; and concatenating the speaker embedding vector with each frame of the modified noisy audio signal after processing by the decoder module, to output an enhanced audio signal.

Similarly, when no speaker embedding vector exists (right hand side), the trained ML model is switched to perform non-personalised noise removal and, in this case, using neural networks of the trained ML model to remove the noise comprises: inputting the noisy audio signal into an encoder module of the trained ML model; concatenating a zero vector with each frame of the noisy audio signal after processing by the encoder module, to generate a modified corrupted audio signal; inputting the modified noisy audio signal into a decoder module of the trained ML model; and concatenating the zero vector with each frame of the modified noisy audio signal after processing by the decoder module, to output an enhanced audio signal.

The speaker embedding vector of a target user supplies the key information pertaining to personalisation of the sound enhancement performed by the ML model. The impact of the speaker embedding vector on personalisation was investigated. The amount of enrolment data needed to perform personalisation was also investigated.

FIG. 14 is a table showing the contribution of a not having a speaker embedding vector for a target user on the performance of the ML model at removing ambient noise from an audio signal. The results presented in this table capture the impact in word-error-rate (WER) and Signal-to-Distortion Ratio (SDR), when the speaker embedding vectors are replaced by unit, zero or random vectors. From the results it can be seen that even with the use of unit or zero vectors as the speaker embedding vectors, the performance of the ML model on removing ambient noise is only marginally impacted. This means that the ML model is able to remove ambient noise when no speaker embedding vector for a target user exists. This concurs with hypotheses that the encoder and decoder parts of the network (see FIG. 2 and FIG. 13) filter out the non-speech noises. The filter blocks which receive the speaker embedding as inputs handle the separation of the target speech from interfering speech and perform poorly on babble noise when presented with non-target embedding vectors.

FIG. 15 is a table showing the impact of different lengths of enrollment data on the performance of the ML model at removing different types of noise from an audio signal. The results presented in this table summarise the impact of the quantity of enrolment data used in the computation of speaker embedding vectors in the overall performance of the ML model. It can be seen that the ML model performs well even with just one second of enrolment data. Overall, it can be seen that even without any enrolment data, the ML model of the present techniques can suppress ambient noise.

Thus, the present techniques provide a causal model for real-time enhancement of speech signals by suppressing the background noise. The Applicant has shown that the proposed approach outperforms current SOTA solution for streaming-based sound enhancement to suppress both non-stationary and babble noise. Moreover, it has been demonstrated that the capability of the present speech enhancement model transfers well across languages.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

What is claimed is:

1. A computer-implemented method for using a trained machine learning, ML, model, promoting smaller model sizes, to perform real-time sound enhancement for a target user, the method comprising:
obtaining a noisy audio signal comprising speech of a target user and noise;
determining whether a speaker embedding vector for the target user exists; and
using neural networks of the trained ML model, implementing casual grouped convolutions to operate on frequency-time without any look-ahead, to remove the noise from the noisy audio signal while maintaining the speech of the target user by switching the trained ML model to perform personalised or non-personalised noise removal depending on whether the speaker embedding vector exists,
wherein based on the speaker embedding vector existing, switching the trained ML model to perform personalized noise removal comprising:
inputting the noisy audio signal into an encoder module of the trained ML model;
concatenating the speaker embedding vector with each frame of the noisy audio signal after processing by the encoder module, to generate a modified noisy audio signal;
inputting the modified noisy audio signal into a decoder module of the trained ML model; and
concatenating the speaker embedding vector with each frame of the modified noisy audio signal after processing by the decoder module, to output an enhanced audio signal; and
based on the speaker embedding vector not existing, switching the trained ML model to perform non-personalized noise removal using a zero vector.

2. The method as claimed in claim 1, wherein based on the speaker embedding vector not existing, switching the trained ML model to perform non-personalised noise removal comprising:
inputting the noisy audio signal into the encoder module of the trained ML model;
concatenating the zero vector with each frame of the noisy audio signal after processing by the encoder module, to generate the modified noisy audio signal;
inputting the modified noisy audio signal into the decoder module of the trained ML model; and
concatenating the zero vector with each frame of the modified noisy audio signal after processing by the decoder module, to output the enhanced audio signal.

3. The method as claimed in claim 1, wherein the speaker embedding vector is precomputed during an enrolment phase and is not computed during a noise removal phase.

4. The method as claimed in claim 1, wherein ambient noise and/or babble noise is removed from the output enhanced audio signal, while maintaining the speech of the target user.

5. The method as claimed in claim 1, further comprising generating the speaker embedding vector for the target user by:
obtaining at least one clean audio signal of the target user captured in a time domain;
converting the clean audio signal to a frequency domain;
generating corrupted audio samples by adding at least one noise sample to the clean audio signal in the time domain;
converting the generated corrupted audio samples into the frequency domain; and
trained the ML model using a training dataset comprising a plurality of audio noise samples and the generated corrupted audio samples in the frequency domain to remove the noise from corrupted audio samples while maintaining speech of individual speakers, and to learn to switch between performing personalised and non-personalised noise removal depending on whether a speaker embedding vector for an individual speaker is available during training.

6. The method as claimed in claim 1, wherein ambient noise is removed from the output enhanced audio signal, while maintaining the speech of the target user.

7. The method as claimed in claim 1 further comprising generating a speaker embedding vector for the target user by:
   obtaining at least one clean audio signal of the target user; and
   applying a speaker recognition model to the at least one clean audio signal of the target user to generate a speaker embedding vector representing a speech profile of the target user.

8. The method as claimed in claim 1 wherein the noisy audio signal is obtained during an audio call, and wherein the method further comprises transmitting the audio signal after processing by the trained ML model to another participant in the audio call.

9. The method as claimed in claim 1 wherein the method further comprises inputting the audio signal after processing by the trained ML model into an automatic speech recognition system.

10. An apparatus for using a trained machine learning, ML, model, promoting smaller model sizes, to perform real-time sound enhancement for a target user, the apparatus comprising:
   an audio capture device; and
   at least one processor coupled to memory and arranged to:
   obtain, from the audio capture device, a noisy audio signal comprising speech of a target user and noise;
   determine whether a speaker embedding vector for the target user exists; and use neural networks of the trained ML model, implementing casual grouped convolutions to operate on frequency-time without any look-ahead, to remove the noise from the noisy audio signal while maintaining the speech of the target user by switching the trained ML model to perform personalised or non-personalised noise removal depending on whether the speaker embedding vector exists,
   wherein based on the speaker embedding vector existing, switching the trained ML model to perform personalized noise removal comprising:
   inputting the noisy audio signal into an encoder module of the trained ML model;
   concatenating the speaker embedding vector with each frame of the noisy audio signal after processing by the encoder module, to generate a modified noisy audio signal;
   inputting the modified noisy audio signal into a decoder module of the trained ML model; and
   concatenating the speaker embedding vector with each frame of the modified noisy audio signal after processing by the decoder module, to output an enhanced audio signal; and
   based on the speaker embedding vector not existing, switching the trained ML model to perform non-personalized noise removal using a zero vector.

11. The apparatus as claimed in claim 10 wherein the noisy audio signal is obtained during an audio call made using the apparatus, and wherein the processor is arranged to transmit the audio signal after processing by the trained ML model to another participant in the audio call.

12. A method for training a machine learning, ML, model, promoting smaller model sizes, to perform real-time sound enhancement for a target user, the method comprising:
   obtaining a training dataset comprising a plurality of audio noise samples, a plurality of clean audio samples that each contain speech of individual speakers, and a speaker embedding vector for each individual speaker;
   generating, using the clean audio samples, corrupted audio samples by adding at least one noise sample to each clean audio sample; and
   training neural networks of the ML model, implementing casual grouped convolutions to operate on frequency-time without any look-ahead, using the training dataset and the corrupted audio samples, to remove the noise from the corrupted audio samples while maintaining the speech of the individual speakers, and to learn to switch between performing personalised and non-personalised noise removal depending on whether the speaker embedding vector for an individual speaker is available during a training round,
   wherein training neural networks of the ML model for the personalised noise removal comprises:
   inputting the corrupted audio sample into an encoder module of the ML model;
   concatenating the speaker embedding vector with each frame of the corrupted audio sample after processing by the encoder module, to generate a modified corrupted audio sample;
   inputting the modified corrupted audio sample into a decoder module of the trained ML model; and
   concatenating the speaker embedding vector with each frame of the modified corrupted audio signal after processing by the decoder module, to output an enhanced audio sample,
   wherein training neural networks of the ML model comprises training neural networks of the ML model for the non-personalised noise removal using a zero vector.

13. The method as claimed in claim 12 wherein training neural networks of the ML model for the non-personalised noise removal comprises:
   inputting the corrupted audio sample into the encoder module of the ML model;
   concatenating a zero vector with each frame of the corrupted audio sample after processing by the encoder module, to generate a modified corrupted audio sample;
   inputting the modified corrupted audio sample into the decoder module of the trained ML model; and
   concatenating the zero vector with each frame of the modified corrupted audio signal after processing by the decoder module, to output the enhanced audio sample.

14. The method as claimed in claim 12, wherein ambient noise and/or babble noise is removed from the output enhanced audio sample, while maintaining the speech of the target user.

15. A server for training a machine learning, ML, model, promoting smaller model sizes, to perform real-time sound enhancement for a target user, the server comprising:
   at least one processor coupled to memory and arranged to:
   obtain a training dataset comprising a plurality of audio noise samples, a plurality of clean audio samples that each contain speech of individual speakers, and a speaker embedding vector for each individual speaker;
   generate, using the clean audio samples, corrupted audio samples by adding at least one noise sample to each clean audio sample; and
   train neural networks of the ML model, implementing casual grouped convolutions to operate on frequency-time without any look-ahead, using the training dataset and the corrupted audio samples, to remove the noise from the corrupted audio samples while maintaining the speech of the individual speakers, and to learn to switch between performing personalised and non-personalised noise removal depending on whether the speaker embedding vector for an individual speaker is available during a training round, wherein training neural networks of the ML model for the personalised noise removal comprises:

inputting the corrupted audio sample into an encoder module of the ML model;

concatenating the speaker embedding vector with each frame of the corrupted audio sample after processing by the encoder module, to generate a modified corrupted audio sample;

inputting the modified corrupted audio sample into a decoder module of the trained ML model; and concatenating the speaker embedding vector with each frame of the modified corrupted audio signal after processing by the decoder module, to output an enhanced audio sample, wherein training neural networks of the ML model comprises training neural networks of the ML model for the non-personalised noise removal using a zero vector.

16. The server of claim 15, wherein training neural networks of the ML model for the non-personalised noise removal comprises:

inputting the corrupted audio sample into the encoder module of the ML model;

concatenating a zero vector with each frame of the corrupted audio sample after processing by the encoder module, to generate a modified corrupted audio sample;

inputting the modified corrupted audio sample into the decoder module of the trained ML model; and concatenating the zero vector with each frame of the modified corrupted audio signal after processing by the decoder module, to output the enhanced audio sample.

17. The method as claimed in claim 1, wherein the neural networks of the trained ML model is a unidirectional recurrent neural network operating on frequency-time without any look-ahead.

18. The method as claimed in claim 1, wherein the neural networks of the trained ML model is configured to use a mixture of causal Time-Depth Separable convolution blocks and unidirectional recurrent neural network layers in domain of real-time frame-in frame-out personalized sound enhancement.

* * * * *